United States Patent [19]
Durance et al.

[11] Patent Number: 5,972,397
[45] Date of Patent: Oct. 26, 1999

[54] METHOD FOR PREPARING DRIED, UNCOOKED POTATO SLICES

[75] Inventors: Timothy Douglas Durance, Vancouver, Canada; Richard Schlomer Meyer, Tacoma, Wash.; Dragan Macura, Burnaby, Canada

[73] Assignee: The University of British Columbia, Vancouver, Canada

[21] Appl. No.: 08/876,770

[22] Filed: Jun. 16, 1997

[51] Int. Cl.⁶ .................................................. A23L 1/216
[52] U.S. Cl. ........................................ 426/242; 426/637
[58] Field of Search ............................... 426/241, 242, 426/243, 637

[56] References Cited

U.S. PATENT DOCUMENTS

| | | | |
|---|---|---|---|
| 3,881,028 | 4/1975 | Capossela et al. | 426/242 |
| 4,073,952 | 2/1978 | Standing et al. | 426/242 |
| 4,839,182 | 6/1989 | Makishima et al. | 426/243 X |
| 5,180,601 | 1/1993 | Gaon et al. | 426/243 X |
| 5,676,989 | 10/1997 | Durance et al. | 426/242 |

FOREIGN PATENT DOCUMENTS

| | | | |
|---|---|---|---|
| 1151945 | 8/1983 | Canada | 426/637 |
| 3443218 | 5/1986 | Germany | 426/242 |

OTHER PUBLICATIONS

Hupsole et al, "Microwave Dehydration of Potatos & Apples", *Food Technology*, vol. 22, pp. 47–50852, Jun. 1968.

*Primary Examiner*—Arthur L. Corbin
*Attorney, Agent, or Firm*—C. A. Rowley

[57] ABSTRACT

A method for producing dehydrated potato slices, specifically suitable for making French fries and French fries produced therefrom, utilizes the application of microwave energy under selected vacuum conditions and a specific range of microwave energy application to produce dried potato slices having a water activity of no more than 0.85.

24 Claims, 1 Drawing Sheet

METHOD FOR PREPARING DRIED, UNCOOKED POTATO SLICES

FIELD OF THE INVENTION

The present invention relates to the production of shelf stable potatoes for making French fried potato pieces.

BACKGROUND OF THE INVENTION

The conventional way of making French fries, for example, for chain stores such as MacDonalds, Burger King and the like, is to distribute frozen raw, blanched or par- fried potato that have been presliced to the appropriate shape e.g. strips. The local restaurants and defrost these frozen French fries in the restaurant and deep fry them. Obviously, transportation and distribution of such frozen potatoes adds a significant cost in view of the required refrigeration both during transportation storing them on premises. The in restaurant refrigerated space required to maintain the chips frozen until they are to be used also contributes to the overhead.

Attempts have been made to provide slice raw potatoes or the like suitable for French frying and having a significant shelf life without requiring freezing has been an object of the industry for sometime. However, to Applicant's knowledge, no one has been successful in producing, for example, a dehydrated product of a quality that is acceptable to the restaurateurs. Thus, the practice of using frozen raw French fries is reasonably standard except in those instances where the fresh potatoes are peeled, sliced and cooked on the premises.

U.S. Pat. No. 4,073,952 issued Feb. 14, 1978 to Standing of the Pilsbury Company, describes a specific attempt to produce potatoes pieces suitable for making French fries. In this process the potatoes are peeled and sliced, blanched and then cooled to about 80° F. or lower followed by drying under conditions of selected relative humidity in the hot air surrounding the raw pieces and using microwave energy to provide about 50–90% of the total drying energy input to reduce the moisture content to 12% or less.

This technique provides a reasonable dehydrated product. However, apparently, it has not been found to be satisfactory by those in the business and thus has not been adopted by those in the business.

BRIEF DESCRIPTION OF THE PRESENT INVENTION

It is an object of the present invention to provide a method of producing dehydrated potatoes specially suitable for making French fries.

Broadly the present invention relates to a method of producing dehydrated potatoes specially suited for making French flies comprising peeling, washing and cutting potatoes to form potato slices of suitable shape for forming French fries, blanching said potato slices to form blanched uncooked slices suitable for drying, subjecting said blanched slices to a vacuum microwave drying step wherein said blanched slices are subjected to a vacuum at a negative pressure of at least 20 inches of mercury while applying microwave energy at a rate to inhibit shrinkage of the blanched potato slices without significantly deteriorating the structural integrity of the blanched slices by over expansion of the slices and in the amount to reduce the water content of the blanched slices to a water activity of no more than 0.85 and thereby produced dried uncooked potato slices suitable for making French fries.

Preferably, said blanched slices while being subjected to vacuum and the application of microwave energy are subject to a mixing action and are swept by an air flow sufficient to carry off the moisture liberated from the slices during the vacuum microwave drying step.

Preferably, said blanching comprises par frying of said potato slices.

Preferably, said vacuum is at least 24 inches, more preferably, between 26 and 28 inches.

Preferably, said microwave energy is applied at least initially at a rate of between 2 and 4 kw per kilogram of blanched potato slices.

Preferably, said moisture activity is no higher than 0.6.

Preferably, said dried uncooked potato slices are packaged under protective conditions to limit contact with moisture and oxygen to provide a packaged product of uncooked slices having a shelf life of at least six months.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
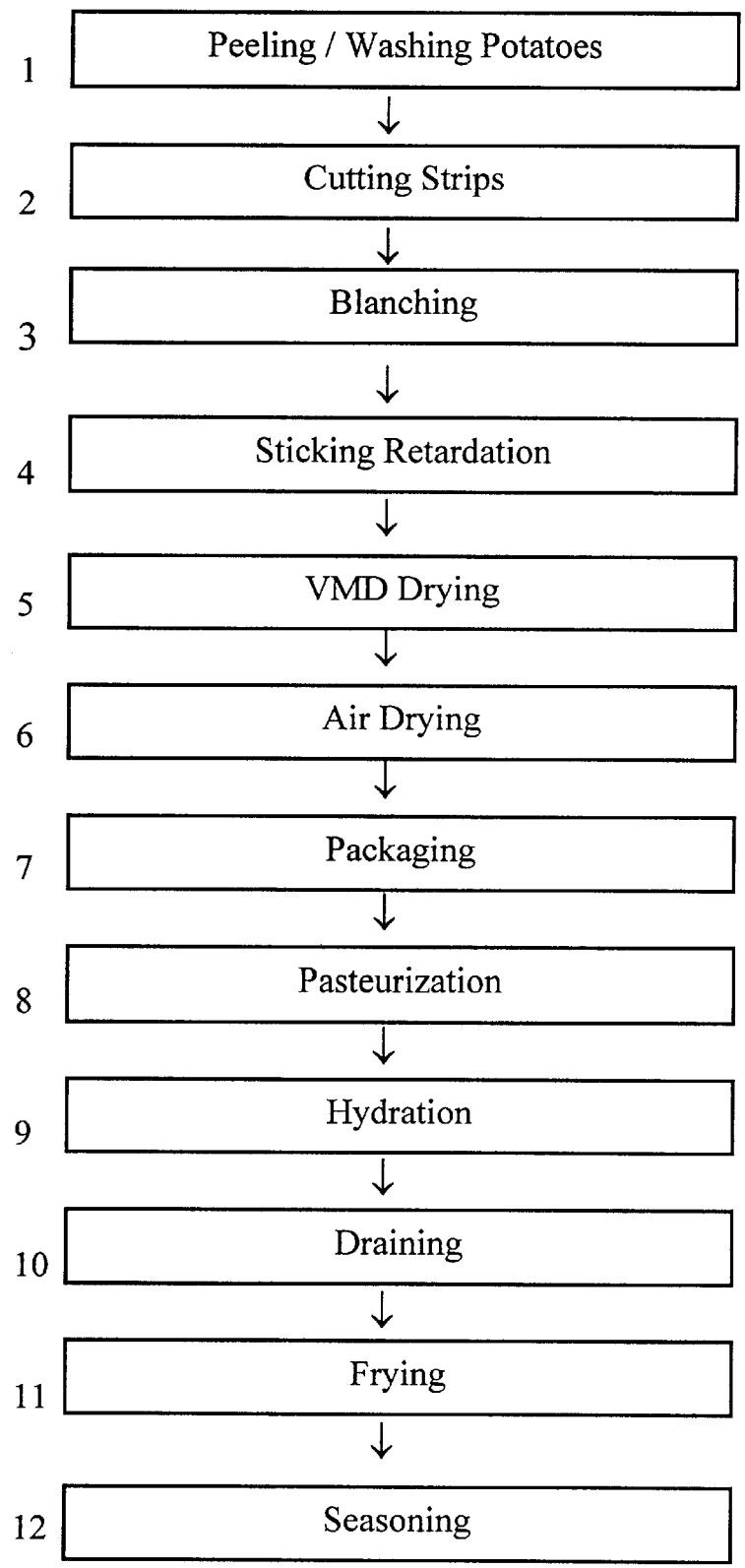
FIG. 1 is a schematic flow diagram illustrating a preferred embodiment of the present invention.

Referring to FIG. 1, the first step is to peel and wash the potatoes as indicated at 1 and then cut them into slices the required shape and size. These potato slices are then blanched as indicated at 3, preferably, the blanching step is coupled with the application of sodium acid phosphate and sodium chloride to the slices if the blanching is in hot water or steam. Also if desired the slices may be presoaked in a solution containing these ingredients and then blanched. This step of applying sodium chloride and sodium acid phosphate is not essential however, the addition of sodium chloride, say in the amount of about 5% based on the weight of the blanch water or soak water, helps in reducing the water activity in the dried product. The application of about 1.5% sodium acid pyrophosphate based on the weight of the blanch water renders the resultant product more resistant to Maillard browning which improves the stability of the product.

Blanching may be performed in any conventional manner, for example, by steaming, or in hot water or simply by heating at a temperature of between 65 and 100° C. It is also possible to par-fry the slices as the blanching step wherein the slices are fried in oil or a short period of time to drive off some of the water but without cooking the slices to any significant degree.

It is then preferred, depending on the blanching technique to rinse or dry the slices immediately after blanching in a sticking retardation step 4 to remove some of the starches on the surface of the raw blanched slices and thereby reduce sticking of the slices together, i.e. starch on the surface of the blanched slices will sometimes result in the slices sticking together and making the subsequent drying steps more difficult The sticking retardation step 4 is optional depending on the condition of the blanched slices i.e. on how severe the sticking problem is.

The blanched uncooked slices are then subjected to vacuum microwave drying is step as indicated at 5. The conditions to which the slices are subjected during this step 5 are extremely important to obtaining the desired results from the use of the present invention.

The slices are subjected to reasonably high intensity microwave energy in the order of between 3 and 5 kilowatts (kw) per kilogram of blanched chip slices, preferably, about 4 kw per kilogram of blanched chip slices for a period of at least 17 minutes but not for a time to do any significant cooking of the slices. It is essential that at the same time as the slices are subjected to the microwave energy they also be subjected to a vacuum of at least 20 inches of mercury (in. Hg) and it is preferred to operate with a vacuum of at least 24 in. Hg. The best results are obtained when the vacuum is kept at between 26 and 28 in. Hg.

While the slices are being subjected to the vacuum microwave drying step 5, they preferably are being agitated e.g. tumbled at 3 to 15 revolutions per minute (rpm.) and swept with air, conditioned as required to carry away any water vapor that escapes from the slices during this step 5, i.e. as water vapor is generated by the application of the vacuum and microwave power it is immediately carried away.

It is extremely important that the vacuum be maintained low and that the energy be coordinated with the vacuum to ensure there the temperature of the slices is not elevated to a temperature and for a time to do any appreciable cooking of the slices so that there is substantially no significant cooking of the slices during the microwave drying step 5.

The microwave drying step 5 is terminated when the moisture content of the dried potato slices has been reduced to be in the order of about 20 %. More particularly it is important that the water activity (Aw) not exceed 0.85, preferably not exceed 0.65 and most preferably, not exceed 0.6.

The term water activity (Aw) as used herein defines a property of solutions or solids which contain water. It is the ratio of equilibrium partial pressure of water vapor in the headspace over the material relative to the equilibrium partial pressure of water vapor over pure water at the same temperature. Thus water activity (Aw) may have a value of between one (1) and zero (0).

The microwave energy is preferably applied at the rate to remove water as quickly as practical from the slices without significantly impairing their structure integrity, i.e. it is important that the microwave energy not be applied at such a high rate as to damage the product as occurs by over expansion which results in delamination of the product and makes it significantly less suitable and not acceptable to the end user.

The vacuum microwave dried product or dried product (potato slices) may be further dried as indicated at step 6, for example, by air drying or infrared drying or the like but without cooking the slices. If the moisture content of the slices has been fully reduced such that the Aw is less than 0.6, normally, this supplemental drying step is not required.

The dried product (uncooked slices) so produced is then packaged as indicated at 7, preferably in a container that is substantially moisture impervious and oxygen impervious to prevent the moisture content of the product increasing substantially and to impair oxidation. Particularly those dried uncooked slices with water activity level higher than Aw=0.6 may have their shelf life enhanced by pasteurizing the slices as indicated by optional step 8 by subjecting them to preferably high temperature for a short period of time, again without any significant cooking of the potato slices.

Thus, produced packaged potato slices may then be stored at room temperature as indicated by step 9 for the desired time. The so produced and packaged potato slices have been stored for periods of at least six months without any significant deterioration of the potatoe slices.

When it is desired to use (cook) the packaged uncooked potato slices, it is necessary to hydrate them as indicated at 9, for example, by application in boiling water for a period of 20 minutes or by heating in water and then permitting the product to hydrate over time which will generally require significantly more than the 20 minutes necessary when subject to boiling throughout the hydration step.

It is also preferred during hydration to apply calcium chloride to the hydration water as it has been found that the use of about 0.2% calcium chloride based on the weight of the potato slices as taken from the package helps to improve the strength characteristics of the cooked French fry product. Once the potato slices are hydrated, they are normally drained as indicated at 10 and then fried immediately prior to their intended consumption. Frying is done in the conventional manner using all conventional equipment and then the fried slices are seasoned as desired as indicated at 12.

Example

The following example describes the application of the present invention and compare the product obtained with those from commercial competing products The steps have been numbered with numbering corresponding to those used in FIG. 1 and describe particular conditions used in each step to carry out the process.

1. Peeling/Washing Potatoes

Locally purchased Russet potatoes were peeled by hand using a commonly available, hand held, potato peeler. They were washed under running cold tap water. Yield data was collected. Batches of 10 to 15 kg were processed at one time.

In addition, frozen McDonald's fries (¼×¼ inch cross section area) were obtained from their supplier. Frozen McCains' shoestring fries (¼×¼ inch cross section area) were obtained from the local grocery store. Both commercial products were reportedly frozen after par-frying.

2. Cutting Strips

Pealed Russet potatoes described in 1 were cut into French fry strips with a Hobart Cutter (Model 84142) fitted with the appropriate attachment. Three different sizes of strips were cut; ½×½inch, ⅜×⅜ inch and ¼×¼ inch cross sectional dimensions. Each pealed potato was fed to the cutter manually. It was aligned longitudinally to maximize French fry length. Good strips were considered to be those which had at least 3 straight sides. They were separated from the slivers, washed in running cold tap water to remove free starch, drained, and weighed before blanching.

3. Blanching.

Example of three different blanching steps are described in paragraphs a), b) and c) below to indicate that each may be employed to carry out the present invention.

a) In Boiling Solution of NaCl and SAPP. Raw, washed potato French fly strips prepared as above described in paragraphs 1 and 2 were placed in boiling solution of 1% to 7% sodium chloride (NaCl), and 0.5 to 2.5% sodium acid pyrophosphate (SAPP) in water. Minimum blanching requirement for each size of the strips was determined experimentally. They were placed in boiling solution for varied lengths of time ranging from 1 minute to 7 minutes. Black color development due to polyphenol oxidase (PO) activity was used as an indicator of heat treatment adequacy. Quarter inch strips needed blanching for 2 minutes, while ⅜ and ½ inch strips needed 3 minutes of blanching.

NaCl in the solution was used for flavor and to aid in the depression of water activity (Aw) in the dry product. SAPP prevents brown color development mainly due to non-enzymatic Maillard reaction, thought to occur in dry fries during prolonged storage. Upper time limit for boiling in this solution was 7 minutes for ⅜ and ½ inch strips and 5 minutes for ¼ inch strips. Beyond these time intervals the strips became over-cooked.

b) In Steam. Above described potato strips were steam blanched by placing them on a wire mesh above a 2 foot diameter steam jacketed kettle of boiling water with a lid firmly placed on the kettle above the strips. The strips were taken out after 3, 5 and 10 minutes of exposure to steam, cooled, and observed after 12 to 20 hours for black color development. No sample developed black color, therefore, 3 minutes was assumed sufficient treatment to inactivate PO in all 3 sizes of potato strips.

c) In Microwave. After cutting the potato strips, sorting, washing, 1.5 kg samples were used in the Vacuum Microwave Drying (VMD) at full power (4 KW) for 2, 5 and 7 minutes before vacuum was applied drying continued. Dry fries were observed for black color formation as an indication of the effectiveness of the treatment. It was found that 7 minutes of microwave heating at atmospheric pressure was needed for adequate inactivation of PO.

Steam blanched and microwave blanched samples could be soaked in the solution of NaCl and SAPP to achieve the same effect as per section 3a above.

The potatoes blanched as described in 3 a) above were used to demonstrate the process in the following stages.

4. Sticking Retardation

After blanching as described in paragraph 3 a), the potato strips were rinsed for about 15 seconds in cold running tap water (approx. 15° C.) to wash off surface starch and thereby reduce stickiness during VMD. They were transferred to a wire mesh screen to drain, and further transferred to a VMD rotating drum for drying.

5. VMD Drying

Vacuum microwave drying was done in the 4 kw microwave dryer. The sample basket could hold up to 5 kg of drained French fries strips. In this example 1.5 kg. samples were used. The rotation speed of the basket could be adjusted from 0 to 20 rotations per minute (rpm). Usually, 6 rpm was used. Full power was used for 16 minutes at the vacuum of −27 inches of mercury (Hg). During this time 1,138 g of water was removed. Moisture content of the sample was reduced from, 81 % to approximately 30 % by weight. The sample was transferred to an air drier for completion of the drying process.

The energy consumption for the VMD portion of drying was calculated to be 2.53 KJ/g of water removed assuming that 75% of the microwave energy was absorbed by the food sample (i.e. 4 kw (at 75% efficiency)×16 min. ×60 sec/min. =2,880 KJ/1,138 g water removed=2.53 KJ/g.). VMD removed an average of 71 g of water per minute from the French fry strips. Air drying was much slower, removing moisture at an average rate of 0.45 g/min.

6. Air Drying

The VMD sample was transferred to an air drier with temperature set to between 65 and 73° C. After 3.5 hours the moisture of the sample was reduced by additional 94 g to 11.2 % by weight. Water activity (Aw) at this point was 0.546.

Density comparison between VMD and Non-vacuum Microwave Drying (NVMD) dried French fries A NVMD sample was prepared using 1.5 kg of frozen McDonalds fries.. These fries were placed in a 5 kg capacity rotating drum inside a microwave chamber the door to the chamber closed, the drum rotated at 6 rpm. and 4 kw microwave power was applied for 5 minutes at atmospheric pressure (no vacuum). After 5 minutes the chamber was opened and the vapor wiped from the inside walls of to chamber. This procedure was repeated 4 times during which a total of 909 g of water were removed.

The power was then reduced to 2 kw and the drier run for another 5 minute period which was then followed by an additional 5 minute period in which 1.5 kw of microwave power was applied. At this point 1071 g of water had been removed from the sample.

The so dried sample was then air dried at a temperature of between 65 and 730° C. for 2 hours and additional 104 g of water removed i.e. a total of 1175 g water were removed.

This sample was then weighed, cooled to room temperature, and stored in a plastic bag at room temperature, over night. The water activity Aw of the sample was then determined to be 0.657 at 21.1° C. and the moisture content was 15.3 % by weight.

Bulk densities of both VMD and NVMD versions of 3 types of ¼ inch French fries was determined by volume displacement method using rape seeds. Rape seed volume of 400 ml was used in 500 ml. graduated cylinder. To this approximately 50 g. of dry French fly samples was added while tapping on a table surface to pack the seeds well and thereby avoid empty space pockets in the cylinder. Initial volume of 400 ml was subtracted from the combined volume to determine the total volume of the French fry samples. The packing of each sample was repeated 3 times. Three separate 50 g samples were used for each treatment. Three treatments were tested. They included McDonalds' fries, McCains's shoestring fries, and Laboratory prepared ¼ inch flies. The fries from each treatment were dried in microwave, with and without vacuum. Average densities of vacuum dried samples for each treatment were compared statistically with those of the samples dried without vacuum. Table 1 contains the summary of these results.

TABLE 1

Statistical comparisons of bulk densities[1] of French fry potato strips dried by microwave energy, with and without vacuum.

| Sample | Mean[2] (g/ml) | S.D.[3] | t-statistic[4] (Significance) |
|---|---|---|---|
| A[5] | 0.53 | 0.02 | |
| B[6] | 0.62 | 0.03 | |
| C[7] | 0.58 | 0.02 | |
| D[8] | 0.66 | 0.03 | |
| E[9] | 0.54 | 0.04 | |
| F[10] | 0.60 | 0.03 | |
| A Vs B | | | p < 0.001 |
| C Vs D | | | p < 0.001 |
| B Vs F | | | p < 0.001 |

[1]Weight of the sample (d.b.) divided by its volume, g/ml.
[2]Average of 9 readings.
[3]Standard deviation.
[4]All t-statistic values lower than significance level (e.g. P = 0.05 or 0.01) indicate statistical difference.
[5]Reconstituted, vacuum microwave dried (VMD) McDonalds French fries.
[6]Reconstituted microwave dried, without vacuum (NVMD), McDonalds French fries.
[7]Reconstituted, VMD McCains' French fries.
[8]Reconstituted NVMD, McCains' French fries.
[9]Reconstituted, VMD Lab-prepared French fries.
[10]Reconstituted NVMD, Lab-prepared French fries.

From these results it is can be seen that the vacuum application resulted in significantly lower bulk density of dried French fries. Visually, VMD fries were less wrinkled, more porous throughout, and generally more appealing, than the same fries dried without vacuum. They re-hydrated slightly faster than their NVMD and they retained their integrity better when in rehydrated form.

7. Packaging

The packaging of dried French fries, produced as described herein, preferably will—be in flexible packaging impermeable to moisture and oxygen, inside a larger ridged container for physical protection and package integrity. The product should be shelf stable at room temperature for a minimum of 6 months provided it is dried to an Aw of 0.6.

8. Pasteurizing—Optional

This step has not been tested to minimize spoilage by yeast and molds. In order to assure microbial health safety of the product Aw has to be lowered to 0.85 or less. If Aw is lowered to 0.60 or less, nothing will grow on the product. If Aw is between of 0.6 and 0.85 various microorganisms may grow and spoil the product. Therefore, if the drying is to be terminated while 0.60<Aw<0.85, a second safety feature is implemented in the packaging system. This may be achieved by pasteurization of the product after packaging, or by modified atmosphere packaging (MAP) in the atmosphere containing 60 to 75 % of $CO_2$. Exact conditions for each of these treatments need to be determined experimentally since they are specific to each product, and depend on the initial microbial load of the product.

In case of pasteurizing, the dried flies would be packaged in a flexible package under vacuum and then passed through a heat tunnel at up to 85° C., or through a hot liquid, to be pasteurized sufficiently to achieve the desired shelf life.

In the event that the heat treatment has a detrimental effect on quality of the fries, the product should be packaged in similar flexible packaging while filling the packages with an atmosphere of 60 to 75% $CO_2$ and the remainder nitrogen. High $CO_2$ atmosphere has an inhibitory effect on mold growth. This technology is commonly used in the food industry and is relatively inexpensive.

Alternatively, if the fries are dried to Aw of 0.60 or less, packaging them in gas and moisture impermeable bags should produce a product with a satisfactory shelf life.

9. Hydration

The dry fries produced using the present invention were hydrated by boiling in 0.2 % (by wt. of water) solution of calcium chloride (CaCl2). Alternatively, the dry fries were boiled for 1 to 5 minutes and further steeped in the same liquid for additional 45 to 60 minutes. Boiling serves to soften the dry potato strips facilitating hydration. It also cooks the potatoes further. As a result, cooking during frying does not have to be as long.

Hydrated potato strips in this sample took up approximately 3.3 times their weight in water within 30 minutes. The original shape of the strips was assumed upon hydration. Potato flavor was also retained. Hydrated French fry potato strips were submitted to texture profile analysis (TPA) by a TA-XT2 Texture Analyzer (Stable Micro Systems, Surrey, England) whereby three ¼ inch strips were cut cross-wise with a 3 mm blade guillotine at a cross head speed of 0.5 mm/sec. The TPA curves were obtained for hydrated VMD fries, hydrated microwave fries dried without vacuum, and thawed McDonalds fries as control. Three readings were done on each set of 3 fries. Four sets of 3 fries were analyzed for a total of 12 readings per sample. Mean values and standard deviations were determined. The means were compared by Student's t-test for comparison of means. The results appear in table 2.

From these results it can be seen that, before frying, the reconstituted French fries which were dried under vacuum (A), although statistically different, resembled the control sample (C) better than those which were microwave dried without vacuum (B). This was also confirmed by visual and organoleptic evaluations. We believe that this was so because there was much less structural damage under vacuum due to lower temperature of evaporation, than there was when drying was done without vacuum.

TABLE 2

Statistical comparisons of hardness[11] in French fry potato strips before deep frying.

| Sample | Mean (N)[12] | S.D.[13] | t-statistic[14] (Signficance) |
|---|---|---|---|
| A[15] | 12.26 | 1.59 | |
| B[16] | 8.39 | 1.92 | |
| C[17] | 15.55 | 2.10 | |
| A Vs B | | | p < 0.001 |
| A Vs C | | | p < 0.001 |
| B Vs C | | | p < 0.001 |

[11]Height of the first texture profile analysis curve, measured in Newtons (N).
[12]Average of 9 readings.
[13]Standard deviation.
[14]All t-statistic values lower than signifcance level (e.g. P = 0.05 or 0.01) indicate statistical difference.
[15]Reconstituted, vacuum microwave dried (VMD) McDonalds French fries.
[16]Reconstituted microwave dried, without vacuum, McDonalds French fries.
[17]Thawed McDonalds French fries.

10. Draining

After hydration, the potato strips were washed in cold, running, tap water. They were then drained by leaving on perforate racks for 10 to 30 minutes before frying.

11. Frying

The re-hydrated potato strips were fried in Canola oil at 180 to 185° C. for 1.5 minutes, while frozen McDonalds sample was deep fried for 2.5 minutes. During frying between 52 and 54.5 % of the moisture was lost. The resulting French fries were submitted to a TPA by using a cylindrical punch probe of 3 mm diameter. Three consecutive readings were taken from one French fry strip. Five strips were tested from each treatment. An average of 9 readings was calculated. A statistical comparison was made between VMD, NVMD and McDonalds frozen sample. All readings were made within 7 minutes after deep frying. The results appear in table 3.

From these results it can be seen that the surface hardness of the VMD French fry was higher than that of both, the NVMD fry and McDonalds' control. In turn, the surface hardness of NVMD was higher than that of the control sample. In sensory terms this translated to a crispier French fry. Of the 3 samples compared, VMD fries were most crisp. They were also softer inside.

TABLE 3

Statistical comparisons of hardness[18] in French fry potato strips after deep frying.

| Sample | Mean (N)[19] | S.D. | t-statistic (Signficance) |
|---|---|---|---|
| A | 2.96 | 0.85 | |
| B | 2.22 | 0.90 | |
| C | 1.65 | 0.58 | |
| A Vs B | | | p < 0.027 |
| A Vs C | | | p < 0.001 |
| B Vs C | | | p < 0.049 |

[18]All footnotes of table 2 apply to table 3.
[19]average of 15 readings was taken.

12. Seasoning.

After frying the French fries were seasoned with granulated salt, but any type of seasoning can be used.

Having described the invention, modifications will be evident to those skilled in the art without departing from the scope of the invention as defined in the appended claims.

We claim:

1. A method of producing dehydrated uncooked potatoes specially suited for making French fries comprising peeling, washing and cutting potatoes to form potato slices of suitable shape for forming French fries, blanching said potato slices to form blanched uncooked potato slices suitable for drying, and subjecting said blanched potato slices to a vacuum microwave drying step wherein said blanched potato slices are subjected to a vacuum at a negative pressure of at least 20 inches of mercury (Hg) while applying microwave energy at a rate to inhibit shrinkage of the blanched potato slices without significantly deteriorating the structural integrity of the blanched potato slices by over expansion of the blanched potato slices and to prepare blanched, dried and uncooked potato slices having a water activity (Aw) of no more than 0.85.

2. A method as defined in claim 1 wherein said blanched potato slices, while being subjected to said vacuum and said application of microwave energy in said microwave drying step, are subject to a mixing action and are swept by an air flow sufficient to carry off the moisture liberated from the blanched potato slices during said vacuum microwave drying step.

3. A method as defined in claim 2 wherein said vacuum is at least 24 in. Hg.

4. A method as defined in claim 3 wherein said vacuum is between 26 and 28 in. Hg.

5. A method as defined in claim 4 wherein said microwave energy is applied at least initially at a rate of between 2 and 4 kw per kilogram of blanched potato slices.

6. A method as defined in claim 4 wherein, said water activity (Aw) is no higher than 0.6.

7. A method as defined in claim 4 wherein said dried uncooked potato slices are packaged under protective conditions to limit contact with moisture and oxygen to provide a packaged product of uncooked potato slices having a shelf life of at least six months.

8. A method as defined in claim 3 wherein said microwave energy is applied at least initially at a rate of between 2 and 4 kw per kilogram of blanched potato slices.

9. A method as defined in claim 8 wherein, said water activity is no higher than 0.6.

10. A method as defined in claim 8 wherein said dried uncooked potato slices are packaged under protective conditions to limit contact with moisture and oxygen to provide a packaged product of uncooked potato slices having a shelf life of at least six months.

11. A method as defined in claim 2 wherein said microwave energy is applied at least initially at a rate of between 2 and 4 kw per kilogram of blanched potato slices.

12. A method as defined in claim 11 wherein, said water activity is no higher than 0.6.

13. A method as defined in claim 11 wherein said dried uncooked potato slices are packaged under protective conditions to limit contact with moisture and oxygen to provide a packaged product of uncooked potato slices having a shelf life of at least six months.

14. A method as defined in claim 2 wherein, said water activity (Aw) is no higher than 0.6.

15. A method as defined in claim 2 wherein said dried uncooked potato slices are packaged under protective conditions to limit contact with moisture and oxygen to provide a packaged product of uncooked potato slices having a shelf life of at least six months.

16. A method as defined in claim 1 wherein said blanching comprises par frying of said potato slices.

17. A method as defined in claim 1 wherein said vacuum is at least 24 in. Hg.

18. A method as defined in claim 17 wherein said vacuum is between 26 and 28 in. Hg.

19. A method as defined in claim 18, wherein said microwave energy is applied at least initially at a rate of between 2 and 4 kw per kilogram of balanced potato slices.

20. A method as defined in claim 17 wherein said microwave energy is applied at least initially at a rate of between 2 and 4 per kilogram of balanced potato slices.

21. A method as defined in claim 1 wherein said microwave energy is applied at least initially at a rate of between 2 and 4 kw per kilogram of blanched potato slices.

22. A method as defined in claim 21 wherein said microwave energy is applied at least initially at a rate of between 2 and 4 kw per kilogram of blanched potato slices.

23. A method as defined in claim 1, wherein, said water activity (Aw) is no higher than 0.6.

24. A method as defined in claim 1 wherein said dried uncooked potato slices are packaged under protective conditions to limit contact with moisture and oxygen to provide a packaged product of uncooked potato slices having a shelf life of at least six months.

* * * * *